Figure 1:
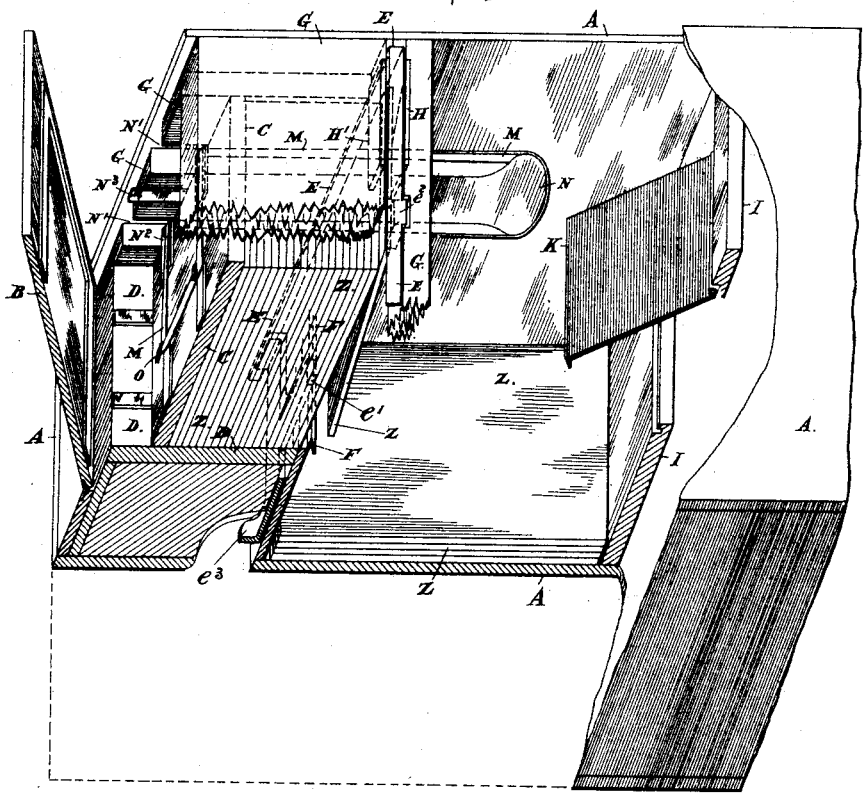

(No Model.) 3 Sheets—Sheet 1.

E. V. SWINDEN & J. EARP.
PHOTOGRAPHIC APPARATUS.

No. 445,911. Patented Feb. 3, 1891.

WITNESSES.
Percy B. Hills.
Robert Emmett.

INVENTORS.
Edward V. Swinden
Joseph Earp.
By James L. Norris.
Atty.

(No Model.) 3 Sheets—Sheet 2.
E. V. SWINDEN & J. EARP.
PHOTOGRAPHIC APPARATUS.

No. 445,911. Patented Feb. 3, 1891.

WITNESSES.
Percy B. Hills.
Robert Pratt.

INVENTORS.
Edward V. Swinden
Joseph Earp
By James L. Norris.
Atty.

(No Model.) 3 Sheets—Sheet 3.
E. V. SWINDEN & J. EARP.
PHOTOGRAPHIC APPARATUS.
No. 445,911. Patented Feb. 3, 1891.
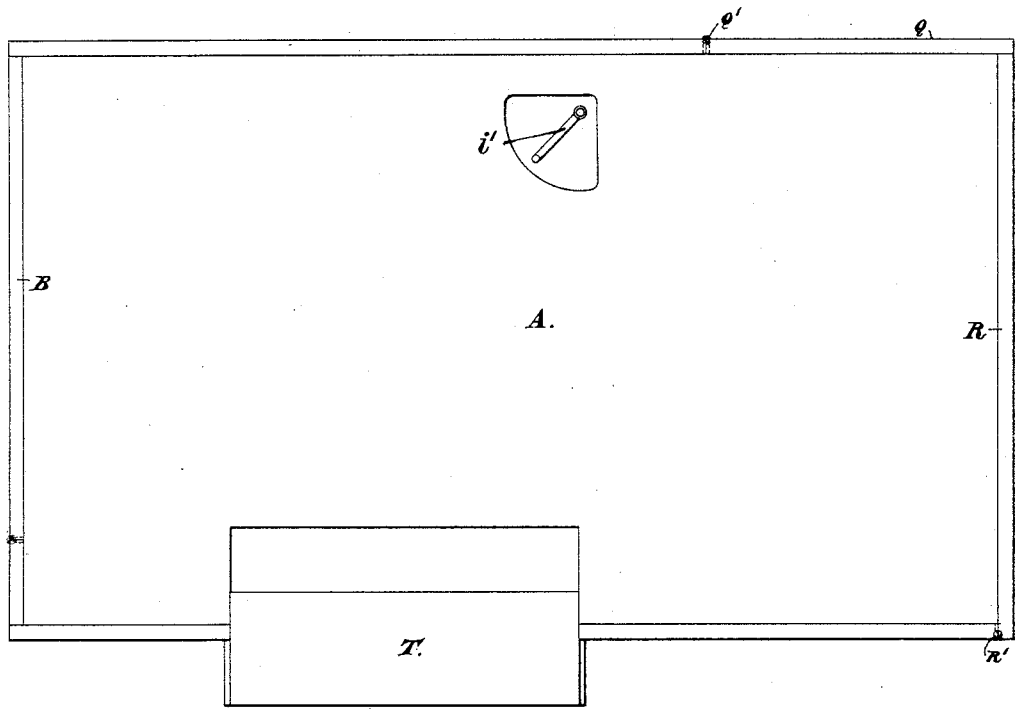
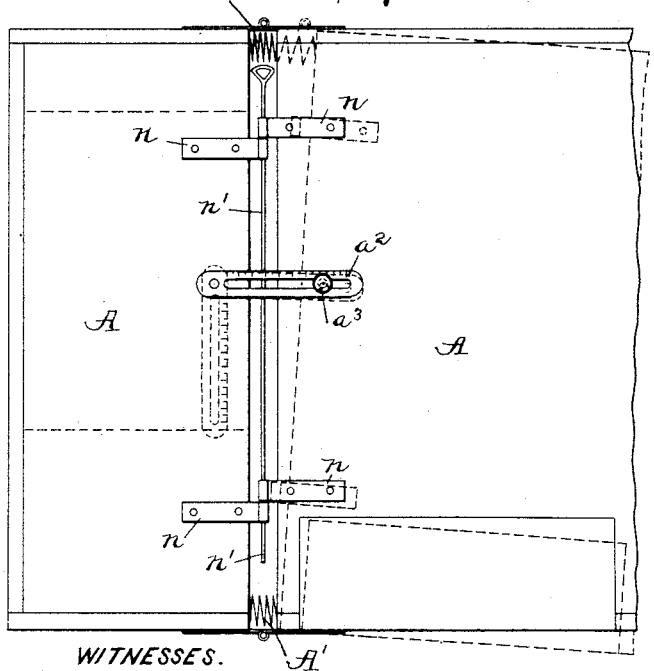
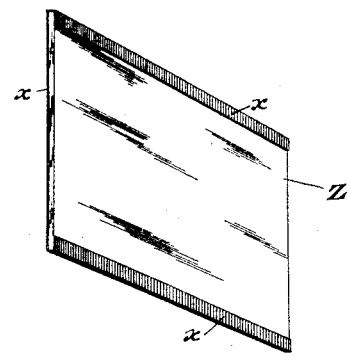

UNITED STATES PATENT OFFICE.

EDWARD VALENTINE SWINDEN AND JOSEPH EARP, OF LIVERPOOL, ENGLAND.

PHOTOGRAPHIC APPARATUS.

SPECIFICATION forming part of Letters Patent No. 445,911, dated February 3, 1891.

Application filed July 17, 1888. Serial No. 280,211. (No model.) Patented in England October 13, 1887, No. 13,879; in France August 3, 1888, No. 192,208; in Belgium August 21, 1888, No. 82,956; in Germany August 24, 1888, No. 50,074, and in Austria-Hungary February 22, 1889, No. 35,404 and No. 35,879.

*To all whom it may concern:*

Be it known that we, EDWARD VALENTINE SWINDEN and JOSEPH EARP, subjects of the Queen of Great Britain, and residents of Liverpool, in the county of Lancaster, England, have invented certain new and useful Improvements in Photographic Apparatus, (for which we have obtained Letters Patent in England, No. 13,879, dated October 13, 1887; in France, No. 192,208, dated August 3, 1888; in Germany, No. 50,074, dated August 24, 1888, and in Austria-Hungary, No. 35,404 and No. 35,879, dated February 22, 1889,) of which the following is a specification.

Our invention relates to photographic cameras or sensitized plate-boxes in which a number of sensitized plates are carried one behind the other for taking a succession of photographic pictures; and it consists, mainly, of a method of removing the plates and stowing them after the pictures have been taken and in the means of feeding up the plates plate by plate.

The camera or plate box is constructed to receive a number of prepared plates or films, and according to our invention as each plate is used we remove it by causing it to fall forward out of the field of the following plate, and as each plate is so removed we feed up another plate to take its place. We construct the plate-box, which may form part of the camera or be attached thereto, of such form and size as to allow a number of plates to be stowed and operated, as described. The plates are fed up by springs or like means and are released, guided, and caused to fall forward by movable pushes, bolts or stops, and guides as they are used. By removing the plates by causing them to fall forward onto the bottom of the camera a very simple and convenient means is obtained of stowing the plate after the picture has been taken, and the camera is enabled to be kept of small dimensions; also, very simple and inexpensive mechanism is required—namely, a spring or springs—to feed the plates forward and a catch or catches to hold and release the plate and allow it to fall forward, preferably face down, onto the bottom of the camera or onto the back of the preceding plate, as the case may be. To cause the plates to fall in order and only one at a time, we provide the top of the camera with a groove of size to suit the thickness of the plate, and we provide the part of the camera on which the plates rest with a ledge, preferably having an inclined face. At the back of this ledge we provide a bolt, by raising which the top edge of the front plate is raised into the groove, the pressure from the back plates causing the front plate to pass over the ledge. Then by pressing down a bolt which is provided in the groove and by canting the camera the plate falls down and then forward face down out of the field of the next plate.

The plates are withdrawn from the camera through a door which is formed in the camera for that purpose.

For the purpose of isolating the plate-box from the lens of the camera, we provide a shutter which is so pivoted in the camera or plate box that it can when required be caused to shield the front plate.

In the foregoing description we have set forth generally the nature, object or objects, and effects of our invention; but in order to make it more fully and exactly understood we will now proceed to describe the same by the aid of the drawings hereto annexed and forming a part of this specification.

The drawings illustrate a camera or apparatus specially designed to carry out the improvements the nature of which has been above explained.

Figure 2:
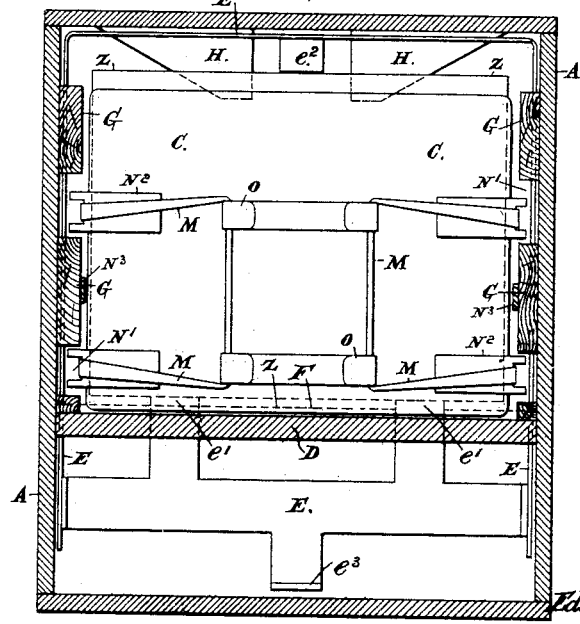
Figure 4:
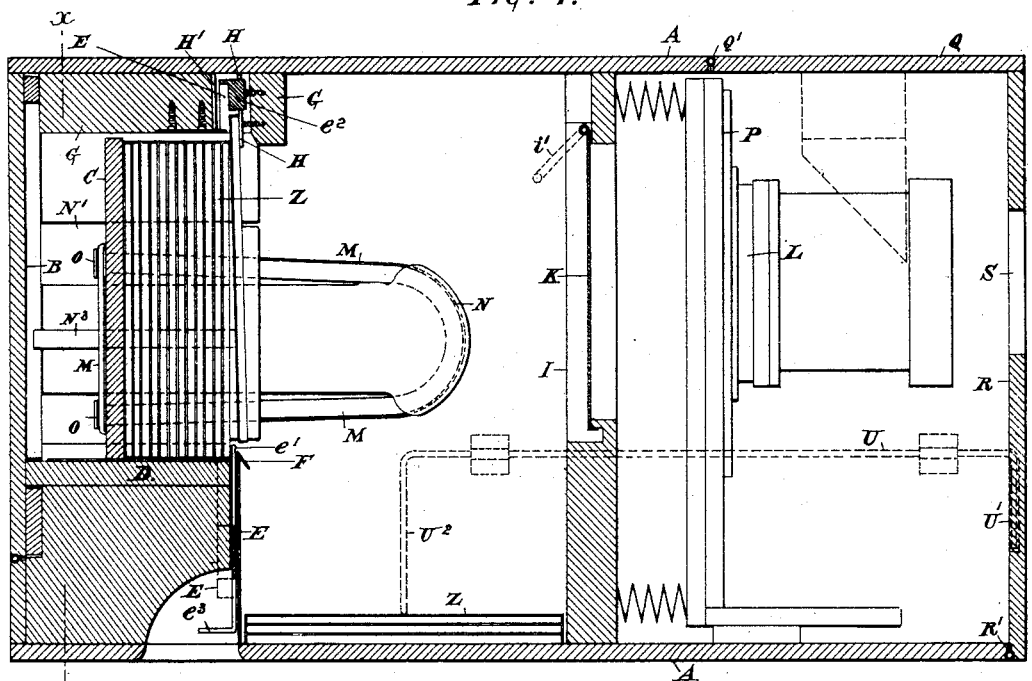
Figure 3:
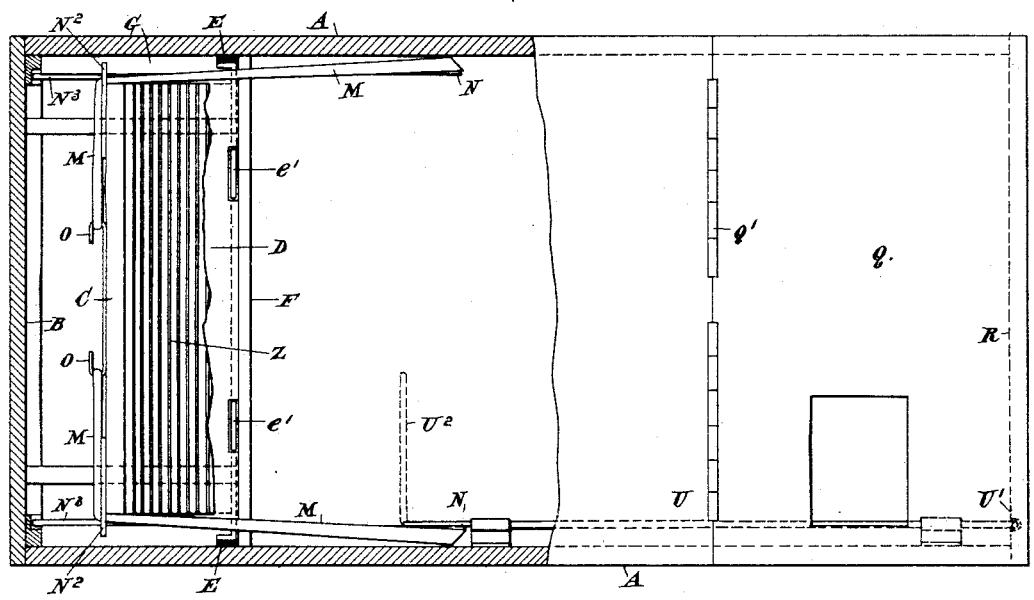

In the drawings, Figure 1 is a top view, partly in section, and with portions of the cover removed in geometric perspective of the camera. Fig. 2 is a detail showing the apparatus partly in cross-section at the line X X, Fig. 4. Fig. 3 is a plan of the apparatus. Fig. 4 shows the apparatus in longitudinal section. Fig. 5 is an outside elevation of the apparatus. Fig. 6 shows a plate provided with a protective backing according to our invention. Fig. 7 shows a modified construction of camera-case.

The camera is divided into three portions. One is the plate-chamber, which is at the rear of the apparatus. The second is the depository-chamber for the plates after exposure and lies in the middle, and the third is that in and by which the lens is placed or carried, all three portions being within a wooden case A; or this case may be made of any other suitable material. The first chamber is that in which the "dry" plates or equivalent sensitive media are stored ready for operating, and the parts within it consist, mainly, of a hinged door B for gaining access to the chamber, a sliding follower C, a table or platform D, upon which the plates are supported, a frame E, having plate-elevating toes $e'$ and depressing-finger $e^2$ and an inclined curb F for passing the plates Z from the plate-chamber and delivering them to the depository-chamber. The frame E is kept in its place by the metallic strips H H', which are secured to the wood lining strips or pieces G, which are provided upon the inner surface of the case A, and it is moved up and down between these liners by a thumb-plate $e^3$, which is formed upon it and is located in a recess provided in the bottom of the case A.

When sensitive films or media other than glass plates such as described are used, such media must in all cases be sufficiently stiff or made sufficiently stiff to render them applicable for use in apparatus operating according to our invention.

The plates Z are kept in place by metallic stops H, secured to the top bar of the liner G, and by the curb F, the upper surface or edge of which is raised above the level of the surface of the table D. The follower C keeps the plates up to the two devices, as will be presently explained.

The depository-chamber lies directly in front of the frame E and is of sufficient length to take the plates easily when lying in the horizontal plane, as shown, and it is divided from the front portion of the camera by a partition I. This partition has an aperture in it admitting the light from the lens L to the front plate of the lot in the plate-chamber. A shutter K is provided on the partition I in order to exclude the light whenever required, and also, if desired, to be used as a substitute for the ordinary lens-cap in making exposures, and it is operated by a lever $i'$, placed outside the case A.

Access to the bottom of the depository-chamber is had by a sliding door T, and through the aperture over which the door slides the plates can be removed from the chamber at will.

The function of the follower C is to feed the plates forward as they are passed one by one to the depository-chamber, and its movement is effected by two rubber straps or bands M under tension, arranged one on each side of the camera. The bands are held by lugs N and pass to the back of the follower C, where they are secured by hooks O. Between the lugs N and the back of the follower C they lie in grooves N', formed in the liners G, and in passing over the edges of the follower C they take over forked guides $N^2$. It will now be plainly seen that as the plates are removed from the plate-chamber to the depository-chamber the tension on the bands M moves the remaining plate or plates, as the case may be, up to the front stop H and curb F. To allow the follower C to be removed in order to introduce fresh plates or other object, the bands M are first taken off the hooks O by the finger and thumb and then placed over the end of the strips G, which lie between the grooves N' N', the metallic pieces $N^3$ projecting a little beyond the liners G to keep them from slipping off. When this is done, the follower can be withdrawn, the door B of course being open.

Our invention further consists in providing the back of the plates of the kind herein specified with paper or other suitable material $x$, of a color which would render the light passed through them non-actinic, or, obviously, black paper or other like material may be used instead of the colored material. In this way if a number of plates be used and placed together and one of such a set be exposed to the light, the backing of the exposed plate would preserve the next plate against injury by light. The material is preferably lapped over the top and bottom edges of the plate about one-eighth of an inch, (see Fig. 6,) as by this means these overlapped ends of material constitute distance strips or pieces, or a means of separation when a number of plates are stowed together, as in the apparatus herein set forth, whereby they would be prevented from scratching each other. The paper or other material is by preference made to adhere lightly to the plates, so that it comes away freely or may be easily removed in the developing-bath.

The front portion of the camera may be of any known construction, and is provided with adjustable focusing device, shutter, aiming-lens, and reflectors of any suitable known kind in the ordinary way. In the example illustrated in Fig. 4 the lens-plate P is secured to an ordinary bellows-body and is operated and used in the usual manner. The cover Q of the front portion is hinged at Q', and the end R of the camera is hinged at R', these parts thus forming, respectively, a lid and a front door, by which access can be had to the parts within it for any desired object. An aperture S is formed in the door R to admit the necessary light when taking a photograph, and over this aperture the shutter, which may be of any known suitable kind, is placed and works in the ordinary way. For slower exposures—that is, other than those called "instantaneous"—the door R may be let down and the exposure made in the ordinary manner by using the ordinary lens-cap or the shutter K.

The operation of the camera is as follows: Assuming the plate-chamber to be provided with its full complement of plates or any less number, the doors B, Q, and R are closed, the shutter K raised, and the ordinary exposing-shutter covering the aperture S—that is to say, assuming the camera be ready for taking a photograph of any object, such object is brought within the focus of the lens in the usual way, and the shutter is operated and the front plate of the pile exposed in the ordinary manner. Now to take a second photograph the front plate must be first removed, and this is effected in the following manner: The thumb-plate $e^3$ being pressed upward, the toes $e'$, which lie directly beneath the front plate, raise the plate until its lower edge stands above the level of the upper edge of the curb F. This lower edge will be pressed forward by the follower C, and the plate then assumes an inclined position, having its lower edge on or over the incline of the curb F and its upper edge held between the plate next behind it and the stops H, these being inclined forward, as shown, to allow the plate to assume an inclined position. To dislodge the plate from its position the thumb-plate $e^3$ is now drawn down, by which action the finger $e^2$, which lies directly above the upper edge of the front plate, presses the plate down out of the grip of the stops and the next plate, and thereby the plate falls on its lower edge to the bottom of the depository-chamber or onto plates already lying in this chamber and stands in a nearly vertical position. The next and final movement consists in inclining the front end of the camera downward, whereby the plate falls face downward on the bottom of the depository-chamber or onto the plates already discharged, as shown in the drawings. In this manner the whole complement of plates can be removed *seriatim* from the plate-chamber to the depository-chamber.

In cases where it is desired to take photographs upon the plates, films, or other sensitive media in which the horizontal plane lies across the smallest dimensions of the plates, or in any case where the camera is placed with one of its sides uppermost instead of its normal position, we provide a rod U, running between the front of the camera, where it is provided with a handle $U'$, and the depository-chamber, where it is provided with a finger $U^2$. Then by turning the handle $U'$ the finger $U^2$ can be turned down onto the plates lying in the bottom of the chamber and clamped by any known suitable device to hold them while the camera is turned upon its side and during the operation of taking the photograph. When the operation is over, the camera is turned up to its normal position and the finger $U^2$ removed, when the plate operated upon can be passed to the depository-chamber, as above described.

When our invention is applied to ordinary cameras or combined detective and ordinary cameras, we form the camera-case A in two parts at or near the junction of the plate-chamber and the depository-chamber and connect them together by an expanding portion $A'$, as illustrated in Fig. 7, in order to obtain an elevation or depression of the lens and keep the plate in the vertical plane, the necessity for which is well understood. To fix the inclination when obtained, links $a^2$ and thumb-screws $a^3$ are provided, by which they can be clamped and held in the required position, as shown; and as it may be desired to take photographs with the camera on its side or other position we provide hinges $n$ on top, bottom, and sides and pass through one set of these hinges a pin $n'$. The particular set of hinges through which it is passed will of course depend upon the relative positions of the camera and the object to be taken.

The following, among others, are advantages attending the use of our invention.

A considerable number of ordinary glass dry plates or equivalent sensitized films or like media can be carried in the camera, thereby doing away with dark slides, as ordinarily used, and when the camera is charged with its complement or any less number of plates the whole are stored inside and exposed *seriatim* without once having to open any portion of the camera or draw out any slide or sliding gear.

The operation of removing the exposed plate from the field of the lens and placing the next in position is accomplished by a simple movement of a small bolt or catch immediately within the body of the camera by one of the fingers or thumb, and the movement is effected in a moment's time.

As a detective camera, the invention is specially applicable, as the operation may be effected without attracting attention.

The removal from the camera of any exposed plates required for development can be effected without disturbing or interfering in any way with the remaining unexposed plates, and fresh ones may at any time be added, if desired, until the full charge is made up again.

For a given size the camera is compact and very light—for instance, a quarter-plate camera of the detective class charged with a battery of two dozen glass plates, respectively, four and one-fourth by three and one-fourth inches, and fitted with a rapid rectilinear lens of five and one-half inches equivalent focus and space for an instantaneous shutter of any known suitable type, if used, measures about ten and one-fourth inches long by six and one-fourth inches deep by five and one-half inches broad.

What we claim as our invention, and desire to secure by Letters Patent, is—

1. The herein-described method of removing sensitive plates or films from the primary to the secondary chamber of a photographic camera, consisting in moving said plates forward directly from the primary to the secondary chamber in a nearly vertical position, with the lower edge of each plate when so moved resting upon the floor of said secondary chamber or on the back of a horizontal plate therein, and then tilting forward the plate so delivered and causing it to fall from said vertical position to a horizontal one within said secondary chamber, substantially as described.

2. The herein-described method of removing sensitive plates or films from the primary to the secondary chamber of a photographic camera, consisting in first raising the front plate of said plates, whereby it is disengaged from a stop or curb and falls into the secondary chamber in a nearly vertical position, with the lower edge of such plate resting upon the floor of said secondary chamber or on the back of a plate or film therein, and then tilting forward said plate or film so delivered and causing it to fall from said vertical position to a horizontal one about the said lower edge on which it rests and onto the floor of or the back of the films or plates within said secondary chamber, substantially as described.

3. In a photographic camera, the combination, with a primary chamber adapted to receive and hold a plurality of plates or sensitive films, of a spring-pressed follower C, a curb F, up to or against which the front plate of said plurality of plates is pressed by said follower, and a sliding device $e'$, impinging on the lower edge of said front plate or film and adapted to lift it over said curb, whereby said plate is free to fall vertically to a secondary chamber edgewise, substantially as and for the purposes set forth.

4. In a photographic camera having a primary chamber adapted to receive and hold a series of sensitive plates or films without holders one behind the other, and a secondary chamber disposed in front of the primary chamber and adapted to receive and hold the said plates or films in a horizontal position and having its floor below the level of the floor of the said primary chamber, the combination of front stop or curb against which the front plate of said plates abuts, and whereby it is held in position in said primary chamber, a spring-pressed follower by which said plates are pressed forward and up to said stop or curb, a mechanism operated by hand adapted to act directly on the edge of said front plate or film and disengage it from said stop or curve and remove it from the primary to the secondary chamber, the said disengaging and removing device being adapted to move the plates forward directly from the primary to the secondary chamber, so that said plates fall therein in a nearly vertical position, the lower edge of each plate when so moved resting upon the floor of or on the back of the plates within said secondary chamber, and said secondary chamber being adapted to allow each of said plates to fall from said vertical position to a horizontal one about the said lower edge on which it rests and onto the floor of or the back of the plates within said secondary chamber, substantially as set forth.

5. In a photographic camera, the combination of a primary chamber adapted to receive and hold a plurality of dry sensitive plates or films Z, a frame E, having parts $e'$ and $e^2$, by which the front plate is raised over a front stop or curve F and removed from said chamber, a follower C, kept up to the back of the plates by a spring or springs for feeding said plates up to said front stop or curb and within range of the action of the said removing device, and a second chamber disposed in front of the primary chamber and adapted to receive and hold the said plates as they are passed from the said primary chamber after exposure and to hold them in a horizontal position, as described, all substantially as set forth.

6. In a photographic camera in which the plates after "exposure" are passed in succession from one chamber to another, as described, the mechanism herein described for effecting the passage of said plates from the one chamber to the other, said mechanism consisting of a sliding frame E, having toes $e'$ for raising the said plates and fingers $e^2$ for pressing down said plates, a curb F, over and down which the plates are moved, and a spring or springs M, pressing the plates over the said curb, arranged and operating substantially as set forth.

7. In a photographic camera, the combination, with a primary chamber adapted to receive and hold a plurality of sensitive films or plates, of a spring-pressed follower C, a curb F, and a sliding frame having a part $a'$ impinging upon the lower edge of the plate to lift it over the curb, and part $e^2$ drawing said plates down in front of said curb, said frame having a thumb-plate $e^3$ lying in a recess accessible to the operator, substantially as described.

8. In a photographic camera, the combination, with a follower C, of springs or elastic bands M, caught over lugs N upon the wall of the chamber and over hooks O on the follower, a curb F, stops K upon the camera-box, a frame having toes $e'$ and fingers $e^2$ and thumb-piece $e^3$, a secondary or exposing chamber, and a movable shutter between the latter and the lens, substantially as described.

EDW. VALENTINE SWINDEN.
JOSEPH EARP.

Witnesses:
ERNEST R. ROYSTON,
JAMES ANDREW COUBROUGH,
*Both of 15 Water Street, Liverpool.*